(12) United States Patent
Sich

(10) Patent No.: US 6,186,411 B1
(45) Date of Patent: Feb. 13, 2001

(54) WHEEL FLANGE LUBRICATION NOZZLE

(75) Inventor: Gary M. Sich, Irwin, PA (US)

(73) Assignee: Westinghouse Air Brake Technologies Corporation, Wilmerding, PA (US)

(*) Notice: Under 35 U.S.C. 154(b), the term of this patent shall be extended for 0 days.

(21) Appl. No.: 09/440,395

(22) Filed: Nov. 15, 1999

(51) Int. Cl.[7] .................................................. F02M 47/02
(52) U.S. Cl. .............................. 239/89; 239/584; 239/583
(58) Field of Search ................................. 239/88, 89, 92, 239/533.1, 583, 584, 95

(56) References Cited

U.S. PATENT DOCUMENTS

| | | | | |
|---|---|---|---|---|
| 1,546,596 | * | 7/1925 | Mader | 239/584 |
| 1,802,933 | * | 4/1931 | Von Salis | 239/583 |
| 3,204,876 | * | 9/1965 | Elverston | 239/584 |
| 3,215,352 | * | 11/1965 | Meraz, Jr. | 239/584 |
| 4,907,741 | * | 3/1990 | McIntyre | 239/583 |
| 5,186,393 | * | 2/1993 | Yie | 239/584 |
| 5,908,161 | * | 6/1999 | Womac et al. | 239/583 |

* cited by examiner

Primary Examiner—Andres Kashnikow
Assistant Examiner—Jorge S. Bocanegra

(74) Attorney, Agent, or Firm—James Ray & Associates

(57) ABSTRACT

A nozzle assembly allows a metered dose of lubricant to be dispensed. It comprises a housing and a piston assembly. The housing defines a piston bore, a stem bore and a spout, all of which axially aligned. It also defines a lubricant passage, an air inlet, and a channel linked to the inlet. Connectable to a source of lubricant, the passage communicates with the stem bore. Connectable to a source of air, the inlet communicates with the stem bore at a position between the passage and spout. The piston assembly has a piston with stem and a spring. The piston lies in the piston bore, its back communicating with the channel. The protrudent end of the stem protrudes into the stem bore and has a groove defined about its circumference. The spring biases the piston assembly into a charge position wherein the groove aligns with the passage. This enables the groove to fill with lubricant. When the source of air allows air to act upon the back of the piston, the piston assembly moves against the spring through a transfer position. In this position, the stem extends further into the stem bore so that the groove lies between the passage and inlet. When fully moved against the spring, the piston assembly reaches a discharge position. In this position, the groove communicates with both the inlet and spout. This enables the lubricant to be discharged from the groove and out the spout along with the air from the inlet.

20 Claims, 3 Drawing Sheets

US 6,186,411 B1

WHEEL FLANGE LUBRICATION NOZZLE

FIELD OF THE INVENTION

The invention generally relates to a system used to lubricate the flanges of the wheels of a railroad locomotive. More particularly, the invention relates to lubricant nozzle devices of the type commonly deployed in such systems.

BACKGROUND OF THE INVENTION

The following background information is provided to assist the reader to understand the environment in which the invention will typically be used. The terms used herein are not intended to be limited to any particular narrow interpretation unless specifically stated otherwise in this document.

A typical freight train is composed of one or more locomotives and a plurality of railcars with which to haul freight. A locomotive is supported by two or more truck assemblies (hereinafter referred to as "trucks"). FIG. 1 illustrates a locomotive 1 that employs only two trucks, one truck 2 supporting the front of the locomotive and the other truck 3 supporting its rear. Although the trucks shown in FIG. 1 each have only two wheel/axle assemblies 4 (commonly referred to as "wheelsets"), there are locomotives in use in the railroad industry whose trucks employ three or even four wheelsets.

In addition to its wheelsets, each truck features a suspension system, a pair of side frames and the other parts that together form the structure that supports the body of the locomotive. The wheelsets 4 of each truck are disposed in parallel. Each wheelset 4 is composed of an axle shaft 5 and two wheels 6. Each axle shaft 5 has a bearing assembly 7 concentrically fixed about each of its ends. Each wheel 6 is fixed to its axle shaft 5 inboard of, and adjacent to, its neighboring bearing assembly 7. FIG. 1 only shows the near side of the axle shafts 5, wheels 6 and bearing assemblies 7 of the two trucks 2 and 3. The far side (not shown) of each truck is, of course, essentially a mirror image of the near side.

FIG. 1 also shows that the wheelsets 4 of each truck on the near side are interconnected. by a side frame 8. Likewise, another side frame (not shown) interconnects the wheelsets 4 of each truck on the far side. In particular, each side frame has an opening at each end. These openings are each shaped to accommodate the correspondingly shaped external housing of a bearing assembly 7. By its openings, one side frame 8 affixes to, and rides upon, the two bearing housings 7 on the near side of the wheelsets 4 of truck 2. Another side frame 8 affixes to, and rides upon, the two bearing housings 7 for the wheelsets 4 on the near side of truck 3. Likewise, each truck also has a side frame on the far side that affixes to the two bearing housings located on that side of the wheelsets 4.

The weight of the body of the locomotive 1 is transferred to the side frames 8, and other supporting components, via the suspension systems (not shown) on the trucks. It is the function of the suspension systems to dampen the vibrations that occur between the wheelsets 4 and the body of the locomotive 1. The side frames 8 of the trucks transfer the weight of the locomotive body to the wheelsets 4 of the locomotive 1 via the bearing housings 7. Being fixed within the openings and thus rendered immovable by the side frames, the bearing housings, via the bearings they carry, allow the axle shafts 5 to rotate as the wheels 6 ride atop the rails of the railway track.

FIG. 2 shows a wheelset 4 of a locomotive truck to which a traction motor 9 is attached. This type of wheelset 4 has a gear wheel 10 fixed about its axle shaft 5 inboard of the wheel 6 shown at right. The pinion gear 11 on the shaft 12 of the traction motor 9 is designed to mesh with the gear wheel 10 of its corresponding wheelset 4. Controlled by a train operator situated in the cab of the locomotive 1, the locomotive engines supply the desired amount of electrical power to the traction motors 9 on the trucks. In this way, each traction motor 9 drives the gear wheel 10 of its corresponding wheelset 4 to rotate the wheels 6 and thus propel the locomotive 1 and its railcars along the railway track.

The interaction between the wheels and the tracks on which they ride depends on many factors such as the type of railcar or locomotive to which the wheels are mounted, the environment in which the wheels are used, the weight they bear, and the specific composition and physical profile of the individual wheels. These factors are discussed in depth in THE CAR AND LOCOMOTIVE CYCLOPEDIA OF AMERICAN PRACTICES, 6$^{th}$ edition, ® 1997, published by Simmons-Boardman Books, Inc., incorporated herein by reference.

An example of the physical profile for one type of wheel is illustrated in FIG. 2. Bounded longitudinally by back and front faces 61 and 62, the hub 60 defines a hole (commonly referred to as the "wheel bore") in the center of wheel 6. It is by the wheel bore that the wheel 6 is tightly press-fitted on, and mounted radially about, the wheel seat 51 on axle shaft 5. Emerging from the back and front fillets 63 and 64 of hub 60, the plate 65 extends radially outward from the hub 60. Formed on the outermost periphery of plate 65 is rim 66. Bounded longitudinally by back and front faces 67 and 68, the rim 66 emerges from the plate 65 via its back and front fillets 69 and 70. On the outer circumference of the rim 66 is the area known as the tread 71. Depending on the type of wheel, the contour of the tread 71 may be flat or tapered. The flange 72 of the wheel 6 is formed on the periphery of rim 66, emerging from the back rim face 67. The curved portion of the rim 66 formed at the site where the tread 71 and flange 72 meet is referred to as the flange throat 73.

The wheel treads 71 are designed to adhere to the running (i.e., top) surface of the rails essentially by means of friction. It is this friction between the treads 71 and the running surface of the rails that allows the wheels 6 to gain traction on the rails as the traction motors 9 rotate the wheelsets 4 and thereby propel the train along the railway tracks. As alluded to above, a wheel flange 72 is the tapered projection that extends completely around the inner portion of the rim 66 of a wheel 6. Together, the wheel flanges 72 of each wheelset 4 are designed to keep the wheelset on the railway track by limiting lateral movement of the wheelset 4 against the inside surfaces of either rail.

Due to their contact with the railway track, the wheels 6 of a locomotive suffer wear over time, particularly on their treads 71 and, to a lesser extent, their flanges 72. The treads 71, of course, wear as a result of their direct contact against the running surface of the steel rails. During braking, the treads 71 may suffer wear more severely if the wheels should slip or lockup as they slide atop the rails. The wheel flanges 72 suffer wear due to their contact with inside surfaces of the rails, particularly as the trains negotiate curves in the railway track.

The most important goal of the railroad industry has always been to assure the safety of the passengers and freight that it transports by rail. The integrity of every wheel on a train is therefore of critical importance. A defective or badly worn wheel is likely to lead to a derailment of the train, resulting in serious injuries to passengers or damage to freight. The industry has continually sought to improve the durability and reliability of the wheels, a fact that can be quickly appreciated at a glance by observing a long freight train operating at high speed. Every year the railroad operating authorities spend large amounts of money to inspect, replace, and maintain the wheels on their trains. The industry has long employed procedures to detect worn or defective wheels and promptly remove them from service. The industry also continually makes efforts to improve the processes that manufactures use to make wheels and the systems that the railroads employ to maintain them while in service.

Wheel flange lubrication systems are illustrative of the many systems that the railroad industry uses to prolong the useful life of the wheels. FIG. 3 depicts one type of lubrication system that is used to lubricate the flanges of the wheels of a railroad locomotive. The lubrication system 20 features a refillable reservoir 21, a pump 22, an air control unit 23, spray nozzles 24, and an electronic controller 25 to control the overall operation of the system. The reservoir 21 holds the lubricant, 42 or 58 gallon capacities are often required. The air control unit 23 connects via an inlet line 26 to a source of pressurized air, typically the main reservoir on the locomotive. It houses two solenoids (not shown), the pump solenoid for the lubricant pump 22 and the spray solenoid for the nozzles 24. It also contains a regulator to regulate the pressure of the air supplied to the pump 22. The pressure supplied to the pump 22, from the main reservoir of the locomotive, is typically regulated to 76 psi. The pump 22 is mounted to the bottom of the lubricant reservoir 21 from which it is gravity fed lubricant through a filter (not shown). Powered by a dc source via wires 27, the electronic controller 25 directly controls the solenoids and, through the solenoids, indirectly controls the pump and nozzles. The pump 22 is pneumatically activated by the pump solenoid, allowing the pump to supply lubricant at a preset pressure (e.g., 400 psi) to the spray nozzles 24 via conduits 28. The spray nozzles 24 are also connected to the spray solenoid via lines 29 from which they receive a pulse of pressurized air when the spray solenoid is energized by the electronic controller 25. Mounted to a suitable spot on its truck, each spray nozzle 24 is aimed directly at one of the wheel flanges on the locomotive.

The electronic controller 25 receives input from the axle generator on the locomotive, via wires 30. Optionally, the electronic controller 25 may also receive other inputs, such as signals indicative of when the locomotive is traveling on curved railway track and to which direction the track is presently curving. The electronic controller 25 may also receive inputs 31 indicative of when it should inhibit the lubrication system from operating, such as when the wheels are slipping or during sanding (i.e., when sand is being applied to the rails in front of the wheels 6 of the wheelsets 4 to improve traction).

Operating according to its programming, the electronic controller 25 monitors the signal from the generator to keep track of the speed of the locomotive and the distance that it has traveled. Primed by the pump 22 via conduits 28 with pressurized lubricant from the reservoir 21, each nozzle always stands ready to spray lubricant onto its corresponding wheel flange. The electronic controller 25 can be set to energize the spray solenoid at predetermined intervals, such as at every 10 to 590 feet that the locomotive travels. When energized, the spray solenoid allows pressurized air to pass from the inlet line 26 through the spray solenoid and lines 29 to the nozzles 24. Each time the controller 25 energizes the spray solenoid a pulse of pressurized air flows to the nozzles 24. Ideally, all of the nozzles respond to this pulse in the same manner. Not only does the pulse open each nozzle 24 but, in doing so, shoots with it a dose of lubricant that each nozzle sprays onto the wheel flange of the locomotive at which it is aimed. The electronic controller 25 thus operates the nozzles 24 according to a duty cycle, i.e., dispensing lubricant during a squirt phase and being closed otherwise during an inactive phase of the duty cycle. Moreover, at a desired rate (e.g., every twelve nozzle squirts), the controller 25 energizes the pump solenoid so that the pressure of the lubricant at the nozzles 24 is maintained at the preset level.

The nozzles 24 have proven to be the least reliable components of the wheel flange lubrication system. These prior art nozzles 24 have traditionally employed internally a steel ball as a check valve to prevent or permit the delivery of the dose of lubricant. While the spray solenoid is deenergized, the ball valve within the nozzle is biased to a closed position in which the pressurized lubricant is blocked from exiting the nozzle. When the spray solenoid is energized, however, the force of the incoming pulse of air moves the ball valve to an open position and allows the incoming pulse of air to shoot the dose of lubricant out of the nozzle and onto the wheel flange.

The prior art nozzle, however, has not faired well in the environment in which it was intended to be used. It has exhibited at least three modes of failure. Railroad personnel have reported that the nozzles often function intermittently. A typical complaint would be that a nozzle would work fine for a while, then stop working, work again, and quit yet again. It was also observed that the nozzles would often drool. Instead of shutting-off when the spray solenoid was deenergized, the nozzles would continue to allow lubricant to seep out during the inactive phase. Locomotives on which this drooling problem occurred would often waste rather copious amounts of lubricant. Swings in temperature also adversely affected the operation of the nozzles. The dose of lubricant squirted by a nozzle would increase as the temperature rose. Conversely, as the temperature decreased, the dose of lubricant squirted by a nozzle would decrease.

The design of the nozzle not only left it quite vulnerable to contamination but also was responsible for its sensitivity to temperature. Dirt, dust and other debris would work its way inside the nozzle and soon impede the motion of its internal ball valve. The ball valve would begin to stick, sporadically at first, and eventually close permanently or fail to close fully, regardless of the state of the spray solenoid. This vulnerability to contamination explained the intermittency and drooling problems, and thermal susceptibility explained the variation in the amount of lubricant the nozzle dispensed.

OBJECTIVES OF THE INVENTION

It is, therefore, an objective of the invention to provide a nozzle assembly with which to dispense lubricant reliably onto the flange of a wheel of a railroad locomotive.

Another objective is to provide a nozzle assembly that is highly resistant to contamination and thus much less likely than prior art nozzles to operate intermittently or drool.

Yet another objective is to provide a nozzle assembly that consistently dispenses, every time it is activated, the same amount of lubricant regardless of the temperature of the environment in which it is used.

Still another objective is to provide a nozzle assembly whose design does not employ a ball check valve.

A further objective is to provide a nozzle assembly that is capable of operating without lubricant indefinitely without suffering damage.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the drawings and claims presented herein.

SUMMARY OF THE INVENTION

The foregoing objectives and advantages are attained by the embodiment(s) of the invention summarized below.

In a presently preferred embodiment, the invention provides a nozzle assembly for dispensing a metered dose of lubricant. The nozzle assembly comprises a housing, a piston assembly, and a means to prevent leakage within and from the nozzle assembly. The housing defines a piston bore, a stem bore and a nozzle spout. The stem bore is axially aligned with the piston bore, and the nozzle spout is axially aligned with the stem bore. The housing further defines a vent passage, a lubricant passage, an air inlet passage and a control channel. The vent passage communicates with the piston bore. Connectable to a source of pressurized lubricant, the lubricant passage communicates with the stem bore. Connectable to a source of pressurized air, the air inlet passage communicates with the stem bore at a position along the stem bore between the lubricant passage and the nozzle spout. The control channel links to the air inlet passage. The piston assembly has a piston, a stem and a spring. The piston is disposed in the piston bore with its back side in communication with the air inlet passage via the control channel. The stem has its back end fixed to a front side of the piston and its protrudent end protruding into the stem bore. The stem has a circumference about which is defined a metering groove. The spring biases the piston assembly into a charge position. In this position, the protrudent end of the stem is positioned in the stem bore so that the metering groove aligns with the lubricant passage. This enables the source of pressurized lubricant to fill the metering groove with the metered dose of lubricant via the lubricant passage. The means for preventing leakage is situated in the stem bore. It prevents leakage between the piston bore, the lubricant passage and the air inlet passage as the piston assembly is moved slidingly within the piston bore between the charge position and a discharge position through a transfer position. When the source of pressurized air allows air to act upon the back side of the piston, the piston assembly moves against an opposing force of the spring from the charge position through the transfer position. In the transfer position, the protrudent end of the stem is extended further into the stem bore so that the metering groove lies between, and is sealingly isolated by the leakage preventing means from, the lubricant passage and the air inlet passage. When the pressurized air has fully moved the piston against the opposing force of the spring, the piston assembly reaches the discharge position. In the discharge position, the protrudent end of the stem is positioned in the stem bore so that the metering groove lies in communication with both the air inlet passage and the nozzle spout. This enables the metered dose of lubricant to be discharged from the metering groove and out of the nozzle spout by and with the pressurized air flowing from the air inlet passage.

DETAILED DESCRIPTION OF THE INVENTION

Figure 1:
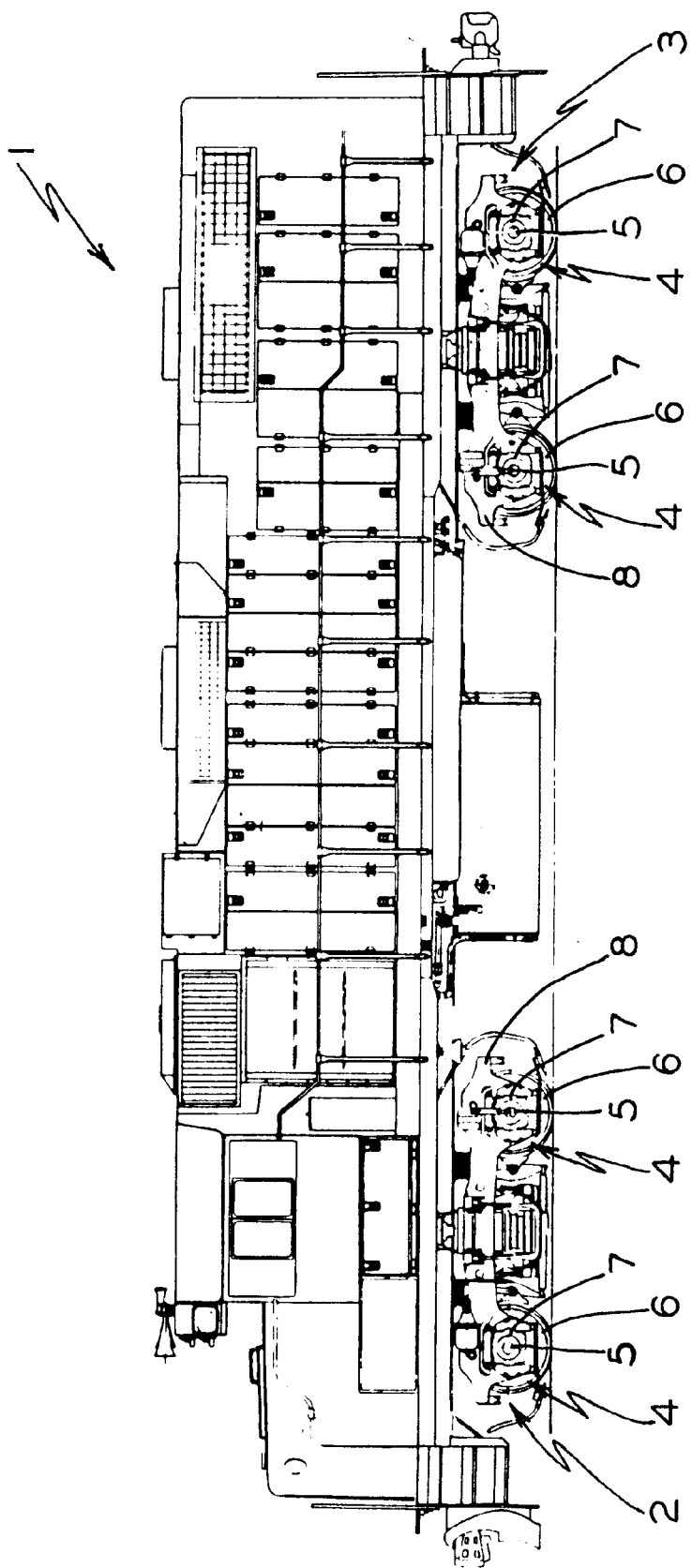
FIG. 1 is a side view of a locomotive that has two trucks, with each truck having two wheelsets.
Figure 2:
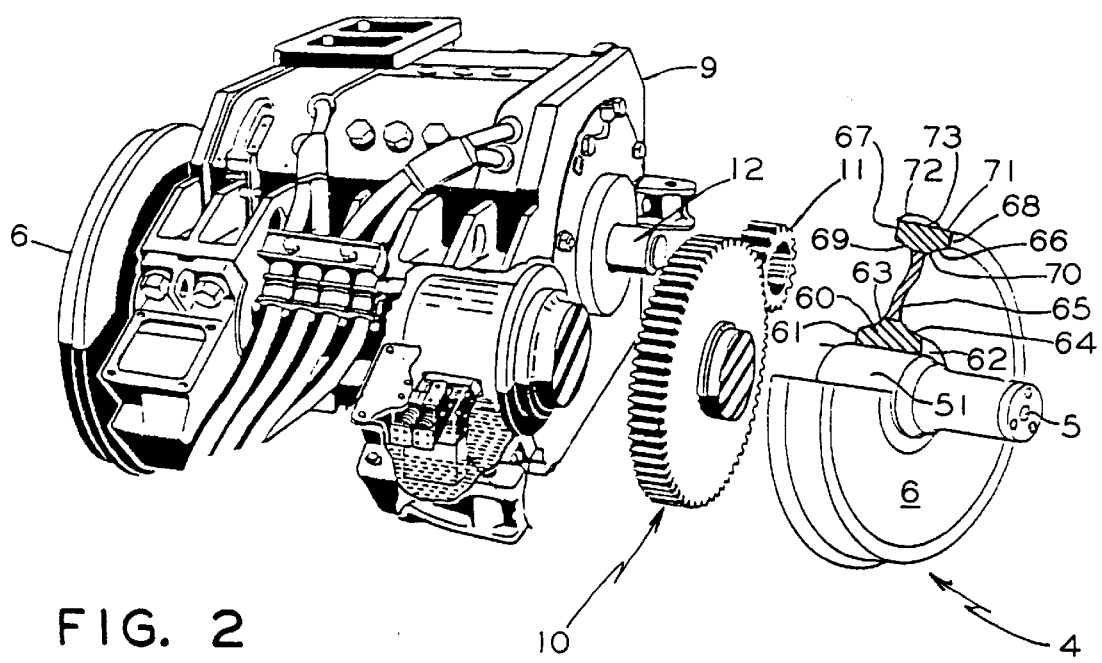
FIG. 2 is a partially exploded, perspective view of a traction motor and wheelset for a locomotive truck, with one of its wheels partially cross-sectioned to illustrate its profile.

Before describing the invention in detail, the reader is advised that, for the sake of clarity and understanding, identical components having identical functions have been marked where possible with the same reference numerals in each of the. accompanying Figures. Moreover, the invention is described below as if carried out in the environment set out in the background section of this document. Despite being described in this particular context, it should be apparent from a reading of this document that the invention may be implemented in a variety of systems, even systems entirely unrelated to the railroad industry. The invention is presented in this context not to limit the scope of the claims set forth below but merely to simplify the description, and thus the understanding, of the invention.

Figure 4:
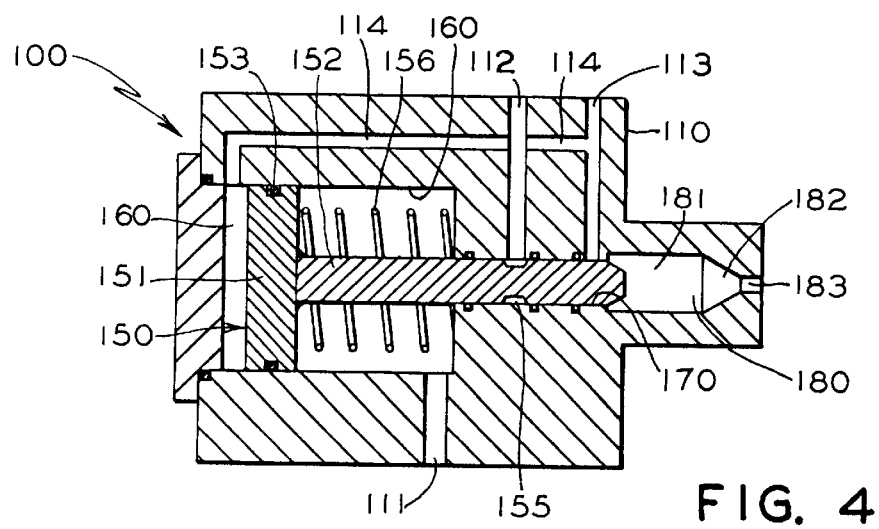
FIG. 4 is a cross-sectional view of a nozzle assembly, shown in its charge position to which it is normally biased.
Figure 5:
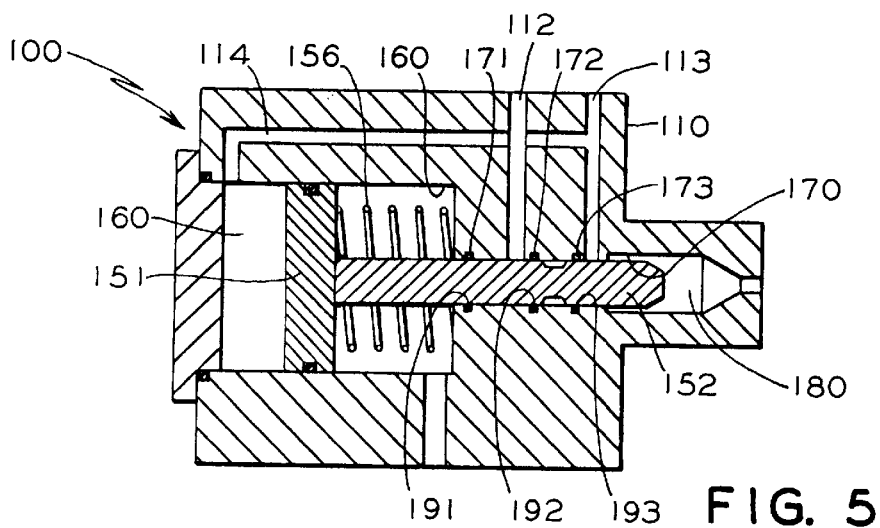
FIG. 5 is a cross-sectional view of the nozzle assembly, shown in its transfer position.
Figure 6:
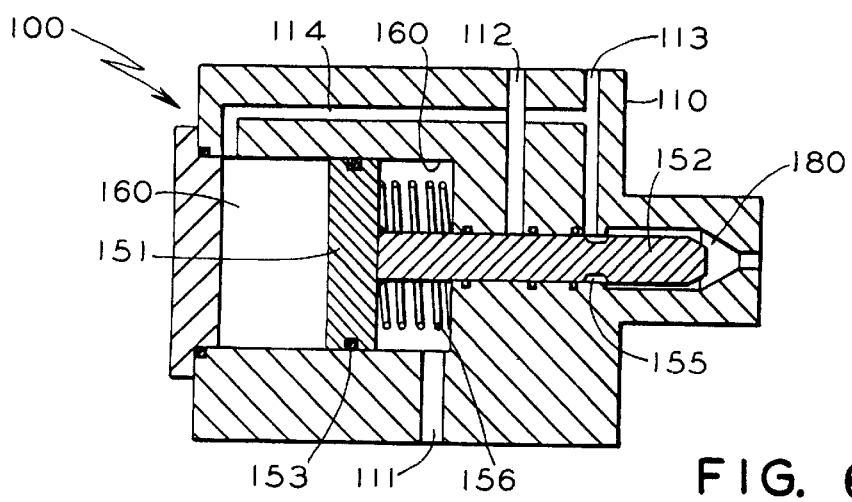
FIG. 6 is a cross-sectional view of the nozzle assembly, shown in its discharge position.

FIGS. 4–6 illustrate the essential details of a preferred embodiment of a nozzle assembly for a wheel flange lubrication system. The nozzle assembly 100 features a housing 110 and a piston assembly 150. The housing 110 defines a piston bore 160, a stem bore 170, and a nozzle spout 180. The stem bore 170 is axially aligned with the piston bore 160, and the nozzle spout 180 is axially aligned with the stem bore 170. The nozzle spout 180 preferably features a cylindrical channel 181 connected to stem bore 170, a conical channel 182 connected to cylindrical channel 181 and a cylindrical outlet 183 connected to conical channel 182. The cylindrical channel 181 preferably has a larger diameter than the stem bore 170.

The housing 110 also defines a vent passage 111, a lubricant passage 112, an air inlet passage 113, and a control channel 114. The vent passage 111 exposes one end of piston bore 160 to atmosphere. It assures that the movement of the piston assembly 150 will not be impeded by pressure or vacuum that could otherwise develop within piston bore 160 in front of piston assembly 150. The lubricant passage 112 communicates with stem bore 170. It connects to a source of pressurized lubricant, such as the lubricant pump 22, via conduit 28, shown in FIG. 3. The air inlet passage 113 communicates with stem bore 170 at a position along the stem bore between lubricant passage 112 and nozzle spout 180. It connects to a source of pressurized air, such as the spray solenoid of air control unit 23, via line 29, shown in FIG. 3. It is through line 29 and air inlet passage 113 that the nozzle assembly 100 receives a pulse of pressurized air whenever the electronic controller 25 energizes the spray solenoid. The control channel 114 links the air inlet passage 113 to the piston bore 160 behind piston assembly 150.

The piston assembly 150 includes a piston 151, a stem 152, and a spring 156. The piston 151 lies within piston bore 160, with its back side in communication with the air inlet passage 113 via control channel 114. Around its circumference, the piston 151 preferably defines a groove in which is retained an annular seal 153 to prevent leakage around the piston as it is moved within piston bore 160. The stem 152 has its back end fixed to a front side of piston 151 and its protrudent end protruding into stem bore 170. Most significant is that stem 152 has a circumference about which is defined a metering groove 155.

The spring 156 is used to bias the piston assembly 150 into a charge position, as shown in FIG. 4. Concentric to stem 152, the spring 156 lies in compression between the front side of piston 151 and the base of piston bore 160 adjacent to stem bore 170. In this charge position, the protrudent end of stem 152 is positioned within stem bore 170 so that the metering groove 155 aligns with lubricant passage 112. When so aligned, the metering groove 155 fills with lubricant because the source of pressurized lubricant, e.g., pump 22 of FIG. 3, always keeps passage 112 pressurized with lubricant. The metering groove 155 can only hold a specified dose of lubricant, a quantity of lubricant unaffected by temperature. The exact amount of lubricant it can hold depends, of course, on the depth and width of the groove.

Preferably, three sealing grooves are defined within the interior of stem bore 170, as best illustrated in FIG. 4. A rear sealing groove 171 is defined interiorly within stem bore 170 adjacent to piston bore 160. Disposed in groove 171 is an annular resilient seal 191. A front sealing groove 173 is defined interiorly within bore 170 near air inlet passage 113 between the air inlet passage and lubricant passage 112. Disposed in groove 173 is an annular resilient seal 193. A middle sealing groove 172 is defined interiorly within the bore near lubricant passage 112 between the lubricant passage and air inlet passage 113. Disposed in groove 172 is an annular resilient seal 192. Preferably o-rings, the resilient seals 191–193 serve to prevent leakage between the piston bore 160, lubricant passage 112 and air inlet passage 113 as stem 152 is moved slidingly within stem bore 170.

Figure 3:
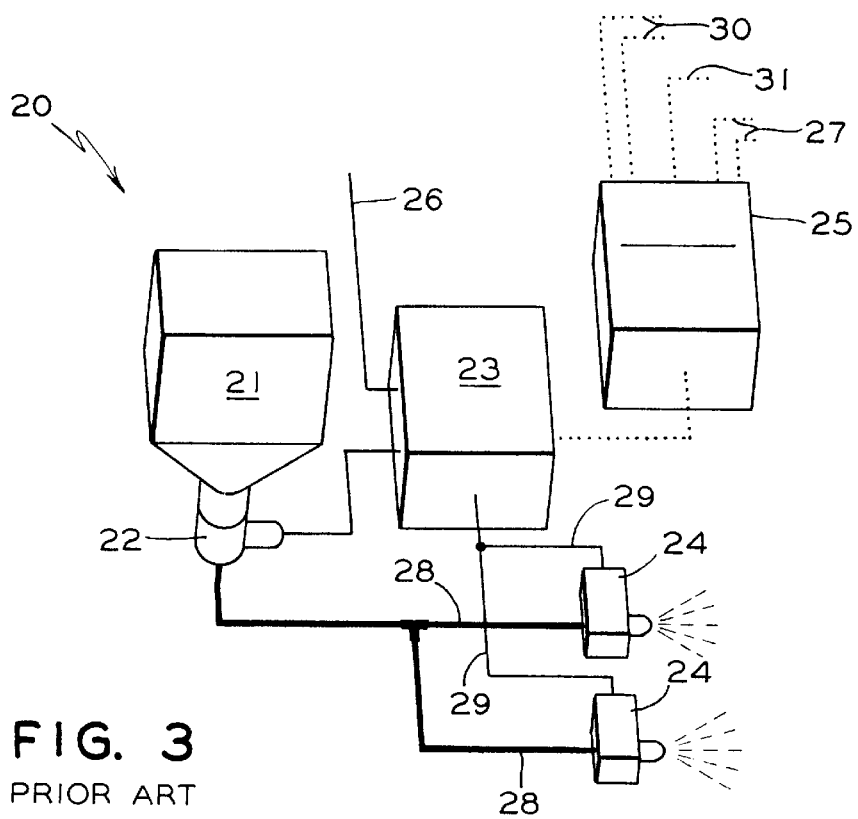
FIG. 3 is a schematic diagram of a system designed to lubricate the flanges of the wheels of a railroad locomotive.

Normally biased to the charge position by the force of spring 156, the piston assembly 150 can be moved within piston bore 160 from the charge position to a discharge position by way of a transfer position. Such movement of piston assembly 150 is ultimately carried out under the control of a control system, such as the electronic controller 25 and related componentry shown in FIG. 3. The operation of nozzle assembly 100, as controlled by the control system illustrated in FIG. 3, is described below.

Operating according to the squirt phase of its duty cycle as dictated by its programming and inputs, the electronic controller 25 energizes the spray solenoid at predetermined intervals. The spray solenoid is, of course, connected to a source of pressurized air, typically the main reservoir on the locomotive, via inlet line 26. Held closed in its deenergized state, the spray solenoid opens and thus outputs a pulse of air each time it is energized. This pulse of air travels from air control unit 23 in which the spray solenoid is housed through line 29 to air inlet passage 113 of nozzle assembly 100. Because the interior end of passage 113 is blocked by stem 152 when piston assembly 150 is in the charge position, the pulse of air cannot travel into stem bore 170. The pulse does, however, travel through the upper part of passage 113 through control channel 114 and into piston bore 160 behind piston 151. As the incoming pulse of air builds behind piston 151, the force generated by the pulse begins to move piston assembly 150 rightwardly out of the charge position. As it moves, the metering groove 155 carries with it the lubricant it had received when it was aligned with lubricant passage 112. Given the speed at which the pulse of pressurized air travels, the resulting build up of air quickly, and transiently, moves piston assembly 150 rightwardly into the transfer position shown in FIG. 5.

While the piston assembly 150 travels through the transfer position, the metering groove 155 is disconnected from lubricant passage 112 and remains disconnected from air inlet passage 113. Resilient seals 192 and 193 keep the pressurized lubricant and air in passages 112 and 113, respectfully, from disturbing the lubricant in metering groove 155. Resilient seal 191, of course, continues to keep piston bore 160 isolated from lubricant passage 112. As the incoming pulse of air continues building behind piston 151, the resulting force generated by the pulse continues to move piston assembly 150 rightwardly, as viewed from the perspective of FIGS. 5 and 6.

As the incoming pulse of air builds to its maximum intensity behind piston 151, the resulting force moves piston assembly 150 against the opposing force of spring 156 to the discharge position shown in FIG. 6. The stem 152 is moved to its rightmost position wherein its metering groove 155 lies in communication with both nozzle spout 180 and the interior end of air inlet passage 113. This allows air from passage 113 to flow into the metering groove thereby discharging the lubricant from metering groove 155 and out nozzle spout 180, as illustrated in FIG. 6. The lubricant may be more easily discharged from metering groove 155 if the cylindrical channel 181 of nozzle spout 180 is made with a diameter larger than that of stem bore 170. Mounted to a suitable spot on a locomotive truck, the nozzle assembly 100 would spray its metered dose of lubricant onto the flange of the locomotive wheel at which it is aimed. The nozzle assembly 100 is thus designed so that it not only opens reliably in response to each pulse of air but, in doing so, also consistently dispenses the same dose of lubricant.

Operating according to the inactive phase of its duty cycle, the electronic controller 25 deenergizes the spray solenoid. This closes the spray solenoid and thereby cuts off the flow of air from air inlet 26 to air inlet passage 113 of nozzle assembly 100. Deprived of the source of air that it needs to be kept in the discharge position, the piston assembly 150 quickly returns to the charge position by virtue of the force of spring 156 acting on the front side of piston 151. Returned to the charge position shown in FIG. 4, the piston assembly 150 then awaits the next squirt phase of the duty cycle.

Taken together, the sealing grooves 171–173 and resilient seals 191–193 they retain may essentially be considered as a means to prevent leakage between piston bore 160, lubricant passage 112 and air inlet passage 113. It should be understood, of course, that this leakage preventing means could also be implemented using various other known components and devices. However it is manifested, the leakage preventing means is intended to prevent air and lubricant from seeping unintendedly into other areas within nozzle assembly 100 as stem 152 is moved slidingly within stem bore 170 between the charge, transfer and discharge positions. Without this leakage preventing means, air from inlet passage 113 could conceivably blow lubricant from passage 112 along the interior walls of bore 170 and into piston bore 160.

The presently preferred embodiments for carrying out the invention have been set forth in detail according to the Patent Act. Persons of ordinary skill in the art to which this invention pertains may nevertheless recognize various alternative ways of practicing the invention without departing from the spirit and scope of the following claims. Persons who possess such skill will also recognize that the foregoing description is merely illustrative and not intended to limit any of the ensuing claims to any particular narrow interpretation.

Accordingly, to promote the progress of science and the useful arts, I secure for myself by Letters Patent exclusive rights to all subject matter embraced by the following claims for the time prescribed by the Patent Act.

I claim:

1. A nozzle assembly for dispensing a metered dose of lubricant, said nozzle assembly comprising:

(a) a housing defining a piston bore, a stem bore axially aligned with said piston bore, and a nozzle spout axially aligned with said stem bore; said housing further defining (i) a vent passage in communication with said piston bore, (ii) a lubricant passage, connectable to a source of pressurized lubricant, in communication with said stem bore, (iii) an air inlet passage, connectable to a source of pressurized air, in communication with said stem bore at a position along said stem bore between said lubricant passage and said nozzle spout, and (iv) a control channel linked to said air inlet passage;

(b) a piston assembly having a piston, a stem and a spring; said piston disposed in said piston bore with a back side of said piston in communication with said air inlet passage via said control channel, said stem having a back end thereof fixed to a front side of said piston and a protrudent end thereof protruding into said stem bore, said stem having a circumference about which is defined a metering groove, said spring for biasing said piston assembly into a charge position wherein said protrudent end is positioned in said stem bore so that said metering groove aligns with said lubricant passage thereby enabling said source of pressurized lubricant to fill said metering groove with said metered dose of lubricant; and (c) a means, situated in said stem bore, for preventing leakage between said piston bore, said lubricant passage and said air inlet passage as said piston assembly is moved slidingly within said piston bore between said charge position and a discharge position via a transfer position; said piston assembly being movable against said spring from said charge position to said discharge position when said source of pressurized air allows air to act upon said back side of said piston, such that when said piston assembly is (i) being moved through said transfer position, said protrudent end extends into said stem bore so that said metering groove lies between, and is sealingly isolated by said leakage preventing means from, said lubricant passage and said air inlet passage and (ii) moved into said discharge position, said protrudent end extends further into said stem bore so that said metering groove communicates with both said air inlet passage and said nozzle spout thereby enabling said metered dose of lubricant to be discharged from said metering groove out said nozzle spout with said pressurized air from said air inlet passage.

2. The nozzle assembly, as claimed in claim 1, wherein said vent passage places said piston bore on said front side of said piston in communication with atmosphere.

3. The nozzle assembly, as claimed in claim 2, wherein said spring lies concentric to said stem in compression between said front side of said piston and a base of said piston bore adjacent to said stem bore.

4. The nozzle assembly, as claimed in claim 3, wherein said means for preventing leakage includes:

(a) a rear sealing groove defined interiorly within said stem bore adjacent to said piston bore;

(b) a front sealing groove defined interiorly within said stem bore near said air inlet passage between said air inlet passage and said lubricant passage;

(c) a middle sealing groove defined interiorly within said stem bore near said lubricant passage between said lubricant passage and said air inlet passage; and (d) an annular resilient seal disposed in each of said sealing grooves so that as said stem is moved slidingly within said stem bore between any of said charge, transfer and discharge positions leakage between any of said piston bore, said lubricant passage and said air inlet passage is prevented.

5. The nozzle assembly, as claimed in claim 4, wherein said piston has a circumference about which is defined a groove in which is retained an annular seal to prevent leakage around said piston as said piston is moved within said piston bore.

6. The nozzle assembly, as claimed in claim 5, wherein said nozzle spout comprises (i) a cylindrical channel connected to said stem bore, (ii) a conical channel connected to said cylindrical channel and (iii) a cylindrical outlet connected to said conical channel.

7. The nozzle assembly, as claimed in claim 6, wherein said cylindrical channel of said nozzle spout has a larger diameter than said stem bore.

8. The nozzle assembly, as claimed in claim 1, wherein said spring lies concentric to said stem in compression between said front side of said piston and a base of said piston bore adjacent to said stem bore.

9. The nozzle assembly, as claimed in claim 1, wherein said means for preventing leakage includes:

(a) a rear sealing groove defined interiorly within said stem bore adjacent to said piston bore;

(b) a front sealing groove defined interiorly within said stem bore near said air inlet passage between said air inlet passage and said lubricant passage;

(c) a middle sealing groove defined interiorly within said stem bore near said lubricant passage between said lubricant passage and said air inlet passage; and (d) an annular resilient seal disposed in each of said sealing grooves so that as said stem is moved slidingly within said stem bore between any of said charge, transfer and discharge positions leakage between any of said piston bore, said lubricant passage and said air inlet passage is prevented.

10. The nozzle assembly, as claimed in claim 1, wherein said piston has a circumference about which is defined a groove in which is retained an annular seal to prevent leakage around said piston as said piston is moved within said piston bore.

11. The nozzle assembly, as claimed in claim 1, wherein said nozzle spout comprises (i) a cylindrical channel connected to said stem bore, (ii) a conical channel connected to said cylindrical channel and (iii) a cylindrical outlet connected to said conical channel.

12. The nozzle assembly, as claimed in claim 11, wherein said cylindrical channel of said nozzle spout has a larger diameter than said stem bore.

13. A nozzle assembly for dispensing a metered dose of lubricant, said nozzle assembly comprising:

(a) a housing defining a piston bore, a stem bore axially aligned with said piston bore, and a nozzle spout axially aligned with said stem bore; said housing further defining (i) a vent passage in communication with said piston bore, (ii) a lubricant passage, connectable to a source of pressurized lubricant, in communication with said stem bore, (iii) an air inlet passage, connectable to a source of pressurized air, in communication with said stem bore between said lubricant passage and said nozzle spout, and (iv) a control channel linked to said air inlet passage; and (b) a piston assembly having a piston, a stem and a spring; said piston disposed in said piston bore with a back side of said piston in communication with said air inlet passage via said control channel, said stem having a back end thereof fixed to a front side of said piston and a protrudent end thereof protruding into said stem bore, said stem having a circumference about which is defined a metering groove, said spring for biasing said piston assembly into a charge position wherein said protrudent end is positioned in said stem bore so that said metering groove aligns with said lubricant passage thereby enabling said source of pressurized lubricant to fill said metering groove with said metered dose of lubricant; said piston assembly being movable slidably within said piston bore against said spring from said charge position through a transfer position to a discharge position when said source of pressurized air allows air to act upon said back side of said piston, such that when said piston assembly is (i) being moved through said transfer position, said protrudent end extends into said stem bore so that said metering groove lies between said lubricant passage and said air inlet passage and (ii) moved into said discharge position, said protrudent end extends further into said stem bore so that said metering groove communicates with both said air inlet passage and said nozzle spout thereby enabling said metered dose of lubricant to be discharged from said metering groove out said nozzle spout with said pressurized air from said air inlet passage.

14. The nozzle assembly, as claimed in claim 13, wherein said vent passage places said piston bore on said front side of said piston in communication with atmosphere.

15. The nozzle assembly, as claimed in claim 14, wherein said spring lies concentric to said stem in compression between said front side of said piston and a base of said piston bore adjacent to said stem bore.

16. The nozzle assembly, as claimed in claim 15, wherein said piston has a circumference about which is defined a groove in which is retained an annular seal to prevent leakage around said piston as said piston is moved within said piston bore.

17. The nozzle assembly, as claimed in claim 16, wherein said nozzle spout comprises (i) a cylindrical channel connected to and having a larger diameter than said stem bore, (ii) a conical channel connected to said cylindrical channel, and (iii) a cylindrical outlet connected to said conical channel.

18. The nozzle assembly, as claimed in claim 13, further comprising:
(a) a rear sealing groove defined interiorly within said stem bore adjacent to said piston bore;
(b) a front sealing groove defined interiorly within said stem bore near said air inlet passage between said air inlet passage and said lubricant passage;
(c) a middle sealing groove defined interiorly within said stem bore near said lubricant passage between said lubricant passage and said air inlet passage; and
(d) an annular resilient seal disposed in each of said sealing grooves so that as said stem is moved slidingly within said stem bore between any of said charge, transfer and discharge positions leakage between any of said piston bore, said lubricant passage and said air inlet passage is prevented.

19. The nozzle assembly, as claimed in claim 18, wherein said piston has a circumference about which is defined a groove in which is retained an annular seal to prevent leakage around said piston as said piston is moved within said piston bore.

20. The nozzle assembly, as claimed in claim 19, wherein said nozzle spout comprises (i) a cylindrical channel connected to and having a larger diameter than said stem bore, (ii) a conical channel connected to said cylindrical channel, and (iii) a cylindrical outlet connected to said conical channel.

* * * * *